United States Patent [19]

Ivaschenko et al.

[11] Patent Number: 5,674,385
[45] Date of Patent: Oct. 7, 1997

[54] BIOFILTER LOAD AND THE METHOD OF PRODUCING POROUS-HOLLOW CERAMIC BLOCKS THEREFOR

[75] Inventors: Pavel Antonovich Ivaschenko; Jury Ivanovich Matveev; Viktor Ivanovich Rakotsa, all of Moscow; Valery Gavrilovich Besedin, deceased, late of Moscow, all of Russian Federation

[73] Assignees: Peter Van Alstyne; MaryAnn Van Alstyne, both of Salt Lake City, Utah

[21] Appl. No.: 150,007

[22] PCT Filed: Apr. 17, 1992

[86] PCT No.: PCT/RU92/00083

§ 371 Date: Nov. 12, 1993

§ 102(e) Date: Nov. 12, 1993

[87] PCT Pub. No.: WO92/20636

PCT Pub. Date: Nov. 26, 1992

[30] Foreign Application Priority Data

May 15, 1991 [SU] U.S.S.R. ............... 4935914/33
May 15, 1991 [SU] U.S.S.R. ............... 4936261/33

[51] Int. Cl.$^6$ .................................................. B01D 25/02
[52] U.S. Cl. ........................... 210/150; 425/547; 425/588
[58] Field of Search .......................... 210/263, 291, 210/293, 500.1, 510.1, 150, 151; 425/547, 588

[56] References Cited

U.S. PATENT DOCUMENTS

| | | | |
|---|---|---|---|
| 564,049 | 7/1896 | Curtis | 210/151 |
| 2,188,162 | 1/1940 | Schulhoff | 210/150 |
| 2,874,844 | 2/1959 | Wanner | 210/150 |
| 3,502,596 | 3/1970 | Sowards | 210/150 |
| 3,615,019 | 10/1971 | Early, Jr. | 210/293 |
| 4,810,377 | 3/1989 | Kato et al. | |
| 4,861,471 | 8/1989 | Nakoa et al. | 210/510.1 |
| 4,882,053 | 11/1989 | Ferri | 210/510.1 |
| 5,021,157 | 6/1991 | Drake et al. | 210/293 |

FOREIGN PATENT DOCUMENTS

| | | |
|---|---|---|
| 2355786 | 1/1978 | France . |
| 2448511 | 9/1980 | France . |
| 2476067 | 8/1981 | France . |
| 1057577 | 3/1959 | Germany . |
| 1646594 | 8/1971 | Germany . |
| 269609 | 12/1987 | Germany . |
| 3815865 | 11/1989 | Germany . |
| 3837798 | 5/1990 | Germany . |
| 3842295 | 6/1990 | Germany . |
| 773021 | 10/1980 | U.S.S.R. . |
| 777015 | 11/1980 | U.S.S.R. . |
| 842048 | 6/1981 | U.S.S.R. . |
| 1491818 | 7/1989 | U.S.S.R. . |
| 1542917 | 2/1990 | U.S.S.R. . |
| 1768028 | 10/1992 | U.S.S.R. . |
| 2160856 | 1/1986 | United Kingdom . |

OTHER PUBLICATIONS

Hackh's Chemical Dictionary, Fourth Edition, McGraw–Hill Book Company, 1969, p. 110.

*Primary Examiner*—W. L. Walker
*Attorney, Agent, or Firm*—Mallinckrodt & Mallinckrodt

[57] ABSTRACT

A biofilter load comprises a stack of blocks of a fired porous clay material having passages extending vertically therethrough for flow of sewage. The passages may be molded in the blocks or may be formed between adjacent blocks by the method of stacking. The blocks are stacked in a frame which is placed in the biofilter. The blocks are manufactured from 8–12 mm clay granules placed in a mold in a layer of 60–80 mm. The clay is heated to the temperature at which the granules begin to swell, is maintained at a temperature in the range of swelling of the clay for a set period of time, and cooled in multiple stages. The process produces blocks with deep branched open pores to provide optimum conditions for development of microorganisms on the pore surfaces and bacteria-denitrification in the deep pores to improve the efficiency and productivity of sewage treatment.

15 Claims, 10 Drawing Sheets

FIG. 10

| NOS. | RAW MATERIAL | THE CONTENT OF OXIDES, MASS % | | | | | | THE NAME OF A GROUP OF THE CLAY RAW MATERIAL | | |
|---|---|---|---|---|---|---|---|---|---|---|
| | | SILICON | IRON | ALUMINUM | ALKALINE METALS | OTHERS | TOTAL | ON THE CONTENT OF $Al_2O_3$ | ON THE PLASTIC NUMBER | ON THE FIRE PROOFNESS |
| 1 | 2 | 3 | 4 | 5 | 6 | 7 | 8 | 9 | 10 | 11 |
| 1 | THE CLAY OF SOFRINO BED, MOSCOW REGION | 64.26 | 5.96 | 14.33 | 5.56 | 9.87 | 100 | SEMI-ACID | 12.4 MODERATELY PLASTIC (AVERAGE) | 1200–1210 C EASILY MELTED |
| 2 | THE CLAY OF USHINSKOE BED, MOSCOW REGION | 64.63 | 6.86 | 13.18 | 5.91 | 9.42 | 100 | SEMI-ACID | 28.0 HIGHLY PLASTIC | 1290 C EASILY MELTED |
| 3 | THE CLAY OF PALCEVSKOE BED, TOWN OSTROV, PSKOV REGION | 51.75 | 6.73 | 18.04 | 5.50 | 17.98 | 100 | ACID | 14.0 MIDDLE-PLASTIC | 1250 C EASILY MELTED |
| 4 | THE CLAY OF LOGKOVSKOE BED, T. VELIKIE LOUKY, PSKOV REGION | 53.42 | 6.45 | 18.10 | 5.62 | 16.41 | 100 | ACID | 15.6 MIDDLE-PLASTIC | 1230 C EASILY MELTED |

FIG. 13

| HARDENING ZONE | | COOLING TIME, MIN. | | |
|---|---|---|---|---|
| COOLING TO A TEMPERATURE °C | THIRD TIME DELAY MIN. | TO A TEMPERATURE OF 800–1000 °C | FOURTH TIME DELAY AT 800–1000 °C | TO A TEMPERATURE OF 70–80 °C |
| 12 | 13 | 14 | 15 | 16 |
| 1,148 | 45 | 13 | 50 | 120 |
| 1,135 | 32 | 10 | 40 | 90 |
| 850 | – | 210 | – | 300 |

| FIG. 14A | FIG. 14B |

| NOS. | DEPOSIT OF CLAY RAW MATERIAL | SWELLING TEMPERATURE °C | | SOLIDIFICATION POINT OF PLASTIC STATE OF THE MATERIAL °C | HEAT TREATMENT | | | | | | |
|---|---|---|---|---|---|---|---|---|---|---|---|
| | | | | | ZONE OF THERMAL PREPARATION | | BURNING ZONE | | | | |
| | | BEGINING OF EXPANSION | EXPANSION TEMPERATURE RANGE | | HEAT °C | TIME, MIN. | FIRST HEATING °C | FIRST TIME DELAY MIN. | SECOND HEATING °C | SECOND TIME DELAY MIN. |
| 1 | 2 | 3 | 4 | 5 | 6 | 7 | 8 | 9 | 10 | 11 |
| 1 | SOFRINO | 1,120 | 1,120–1,800 | 1,140 | 250–300 | 30 | 1,100 | 12 | 1,150 | UP TO 50 |
| 2 | USHINSKOE | 1,100 | 1,100–1,170 | 1,135 | 270 | 30 | 1,080 | 15 | 1,140 | 40 |
| 3 | PROTOTYPE. AUTHOR'S CERTIFICATE NO. 773021 MSTERA | 1,180 | 1,180–1,240 | NEGLECTED | – | – | 1,180 | 15 | 1,200 | 10 |

| CERAMIC PRODUCTS | VOLUME DENSITY kg/m³ | POROSITY | | HOLLOWNESS | | COMPRESSION STRENGTH, MPa | RESISTANCE TO ATTACKS OF | | POWER CONSUMPTION, kwh |
|---|---|---|---|---|---|---|---|---|---|
| | | % | PORE SIZE mm | % | HOLE DIMENSION mm | | MICRO-ORGANISMS | AGGRESSIVE MEDIA | |
| 2 | 3 | 4 | 5 | 6 | 7 | 8 | 9 | 10 |
| 1 | 200 | 84 | UP TO 20 | 60 | 50 | 0.75 | RESISTANT | RESISTANT | 135 |
| 2 | 190 | 86 | UP TO 20 | 55 | 50 | 0.70 | RESISTANT | RESISTANT | 135 |
| PROTOTYPE. AUTHOR'S CERTIFICATE NO. 7773021 | 600 | 50 | UP TO 2.0 | — | — | 0.46 | NOT STUDIED | RESISTANT | 200 |

FIG. 16

| COMPONENTS | THE CONTENT, MASS % IN THE MATERIAL | | |
|---|---|---|---|
| | POROSITY 77–91 % MAXIMUM PORES SIZE TO 20 mm | | |
| | 1 | 2 | 3 |
| SILICON OXIDE | 30.0 | 47.0 | 65.0 |
| IRON OXIDE | 4.0 | 6.0 | 8.0 |
| ALUMINUM OXIDE | 14.0 | 17.5 | 21.0 |
| ALKALI METAL OXIDE | 6.0 | 4.0 | 2.0 |
| LOSSES IN CALCULATION | 46.0 | 25.0 | 4.0 |
| TOTAL | 100 | 100 | 100 |

FIG. 17A

THE CHARACTERISTICS (PROPERTIES) THE CLAIMED LOAD FOR THE BIOFILTER MADE OF POROUS-HOLLOW BLOCKS OF REDOXIDE MATERIAL (SEE FIG. 16)

| NOS: | 1 | 1 | | 2 | | 3 | | | |
|---|---|---|---|---|---|---|---|---|---|
| | | 2 | 3 | 4 | 5 | 6 | 7 | 8 | 9 | 10 |
| 1 | POROSITY % | 77 | 84 | 91 | 77 | 84 | 91 | 77 | 84 | 91 |
| 2 | HOLLOWNESS, % | THE DIAMETERS OF THROUGH CHANNELS 40, 50, 60 mm. THE HOLLOWNESS PERCENT 55–60 | | | | | | | | |
| 3 | VOLUME DENSITY, kg/m³ | 260–280 | 190–210 | 130–180 | 260–280 | 190–210 | 130–180 | 260–280 | 190–210 | 130–180 |
| 4 | EFFECTIVE HEIGHT OF THE LOADING LAYER, m | 1.5 | 1.5 | 1.5 | 1.5 | 1.5 | 1.5 | 1.5 | 1.5 | 1.5 |
| 5 | THE PERMITTED HYDRAULIC LOAD, m³/m² day | 2.5–3.0 | 3.0–3.5 | 2.7–3.2 | 5.0–5.5 | 5.5–6.0 | 5.2–5.6 | 3.2–3.8 | 3.8–4.5 | 3.5–4.0 |
| 6 | THE PERMITTED ORGANIC LOAD, IN BOD, kg/m³ day | 0.28–0.32 | 0.40–0.45 | 0.32–0.40 | 0.75–0.80 | 0.85–0.90 | 0.80–0.84 | 0.50–0.56 | 0.56–0.60 | 0.55–0.57 |
| 7 | THE OXIDATIVE POWER ON BOD, kg/m³ day | 0.30–0.35 | 0.35–0.43 | 0.32–0.40 | 0.78–0.82 | 0.82–0.87 | 0.80–0.84 | 0.45–0.50 | 0.52–0.55 | 0.50–0.53 |

| 8 | THE EFFICIENCY OF WASTE WATER TREATMENT, % | | | | | | | | |
|---|---|---|---|---|---|---|---|---|---|
| A) | IN THE ORGANIC SUSTANCES REMOVAL | 55–87 | 90–91 | 86–89 | 92–95 | 95–97 | 94–96 | 85–87 | 90–92 | 86–89 |
| B) | IN THE NITROGEN COMPOUNDS REMOVAL | 60–65 | 62–67 | 60–65 | 85–87 | 87–90 | 85–87 | 70–72 | 73–75 | 71–73 |
| 9 | THE REMOVAL OF THE WORKED OUT BIOFILM – THE BACK WASHING IS NOT REQUIRED | | | | | | | | |

BIOFILTER LOAD AND THE METHOD OF PRODUCING POROUS-HOLLOW CERAMIC BLOCKS THEREFOR

This invention relates to the field of environment protection and may be used as an universal industrially produced biofilter for purification of sewage.

THE PRIOR ART

One known system uses a load for a biofilter, produced in the shape of pipes, assembled into the blocks, inside which the pipes are disposed on a predetermined distance and provided with grids, made of rods, which create rectangular holes with the length of the side not less than the outer diameter of the pipes. The load is manufactured from plastic, metallic, glass and other kinds of pipes, and installed inside the grids made of plastic, metallic and ceramic rods. The mounting of the block load is started from the bottom side of a biofilter. On each layer at its top and bottom sides the grids are installed, inside the slots of which the pipes are merged to create the block. The height of the block depends on the total height of the biofilter, the height of the pipes, and other conditions. The preferred height of the block is 0.5–2.0 m. Following the assembly of the first block, the assembly of the next is initiated and further until the biofilter's reservoir capacity is filled. In the assembly of the pipe load in biofilters with a large productivity the intermediate columns are placed in the reservoir in order to fasten grids (SU, A, 1542917).

The disadvantage of the above biofilter load is the absence of a surface which can stimulate the development of microorganisms. This leads to an unstable biocenose influencing the quality of the sewage. Also, the carrying ability of this biofilter is low, which leads to inconveniences during its exploitation. The biofilters with this kind of load cover a large area in sewage treatment constructions and, thus, require considerable, land area for their installation. This leads to an increase in the total cost of the whole sewage treatment complex.

It is also known in the art to load a housing for biological purification of sewage with porous-hollow elements mounted inside and laid one on the other with the formation of a purification layer with vertical channels, wherein, these porous-hollow elements are manufactured via the kilning of a clay raw material (FR, A, 2448511).

The disadvantages of this purification systems are as follows: It possesses low capacity as to the retention of suspended substances and the removal of organic and nitrogen-containing compounds, requires water backwashing for the removal of biofilm, and also has a low efficiency in sewage treatment, since the sizes of opened pores, in which a stable biocenoses develops, are in the range from several microns to 1–2 mm.

The closest on its technical characteristics and achieved results is the load for the biofilter containing a voluminous frame module, consisting of columns unified at their top by an open roof with longitudinal and transverse reinforcing girders, with porous-hollow blocks from kilned clay raw material disposed and packed in the frame module forming the purification layer with through channels (SU, A, 1768028).

The closest technical solution of known methods for porous-hollow ceramic product manufacturing is the method of voluminous porous block production, including preparation of plastically formed granules from clay raw material, with diameter of 8–12 mm, laying up of granules to the height of 60–80 mm in a mold, determination of the temperature of the beginning of swelling and the temperature interval of the raw clay swelling, heat treatment of the layer via heating, swelling and sintering with the subsequent cooling to the temperature of 800°–1000° C. and further reduction to the temperature of 70°–80° C., wherein the heat treatment is carried out with the three isothermic time delayed intervals, first of which is carried out at the temperature of the beginning of the swelling during 10–15 minutes (SU, A, 773021).

The disadvantage of this construction of the biofilter load and the method of a porous-hollow block production therefor reside in that the porous structure and porous-hollow volume of the blocks in the form of through channels, are not optimal for the development of microorganisms in it, with the formation of a biofilm. Having a small porosity (20–50%) and the pore size not more than 2 mm, the load does not permit the development of the optimum biocenose. That decreases the quality of sewage treatment both in suspended substances and in the removal of organic and nitrogen-containing compounds. The absence of deep pores in blocks does not permit the development of bacteria-denitrificators that reduce nitrates and nitrites to gaseous nitrogen, which also leads to the decline of the sewage treatment quality. The technology of porous-hollow block production is very complicated, requires the increase of an energy consumption and is not controllable by the vitrification process, especially on the last two stages of the kilning. The produced vitreous mass clogs pores in the upper part, and the existence of a coal dust increases the temperature of the range of a raw material swelling and makes it unstable, thus the strength of the blocks doesn't exceed 0.25–0.40 MPa. The exploitation of the indicated load in a sewage purification installation suffers from a number of difficulties caused by the impossibility of creating a self-bearing construction for biofilters.

THE DISCLOSURE OF THE INVENTION

The task of the creation of a biofilter load and a method of producing porous-hollow blocks therefor is the basis of this invention. This task is implemented via the formation of a deep branched porous-hollow structure with opened pores in voluminous blocks. The blocks are themselves the main elements of a load for the biofilter, owing to the block's provision of optimum conditions for development of microorganisms on the surface of the pores with the biocenosis formation in the shape of biofilm to provide an increase of the biofilter's oxidizing power, and to the deep pores which provide optimum conditions for bacteria-denitrificators which reduce nitrates and nitrites to molecular nitrogen. Also, the formation of through channels in the purification layer formed by the voluminous porous blocks provides for the removal of the utilized biofilm from the layer by a flow of sewage. The blocks have and maintain strength characteristics to permit construction of a self-bearing biofilter load.

The implementation of the above-mentioned measures allow:
- increased working area of the load surface per unit of volume;
- improved hydrodynamic and aerodynamic conditions for the existence of an attached biocenosis with the rising of the biofilter's oxidizing power;
- increased cleaning quality of sewage;
- increased productivity of sewage treatment;
- compact biofilter construction, and hence, small-sized installations and constructions for sewage treatment units;

decreased cost of the treatment of sewage; and creation of mobile units for sewage treatment which are manufactured completely at a factory.

The above object can be accomplished by using a new construction of the biofilter's load and a new method of manufacturing porous-hollow blocks for a biofilter load. In the biofilter load, a three-dimensional frame module, consisting of pillars bound above by means of a crossbar with longitudinal and transverse reinforcing elements and below by means of a bottom with longitudinal and transverse reinforcing beams and gaps therebetween, has arranged therein voluminous porous blocks of burnt clay raw material so as to form a filtering or purification layer with through channels. The voluminous block-frame module is produced in the form of a through container or a cellular container fitted with a cover mounted so as to provide for the pressing of the voluminous porous blocks in the purification layer against each other and against the bottom. The porous-hollow blocks are made of REDOXID material at the following ratio of components, by percent weight:

| | |
|---|---|
| silicon oxide | 30–65 |
| iron oxide | 4–8 |
| aluminum oxide | 14–21 |
| alkali metal oxides | 2–6 |
| [losses in] other products of calcination | - the balance | and are shaped as polyhedrons, or bodies of revolution, or as the combinations of polyhedrons and bodies of revolution, with the ratio of the surface area of the open pores in one cubic meter of the purification layer to the area of its surface equal to $SpS:Spl.1m^3=(8–12) \cdot 10^3$, and the surface area of the through channels in one cubic meter of the purification layer, consisting of porous-hollow blocks with the through channels or porous-hollow blocks laid one on the other and one close to the other with the formation of the through channels, to the surface area of one cubic meter of the purification layer equal to $StS:Spl.1m^3=0.7–2.3$, where

| | |
|---|---|
| SpS | [–] is the surface area of [opened] open pores in one cubic meter of the purification layer; |
| StS | [–] is the surface area of the through channels in one cubic meter of the purification layer made from porous-hollow blocks with the through channels or from porous-hollow blocks[,] laid one on the other and one close to the other [with the formation of the through channels] to form through channels; and |
| $Spl.1m^3$ | [–] is the surface area of one cubic meter of the purification layer. |

The porous-hollow blocks in the shape of polyhedrons are made, for the most part, in the form of a rectangular prism with the length to the width to the height ratio of 1:(1.5–2.0):(1.5–2.0) respectively with the vertical holes in the body of the prism and trough-like channels along the perimeter of the prism in the vertical plane, or in the shape of a girder with the length to the width to the height ratio 1:(3.0–4.0):(2.0–3.0), respectively.

The cover of a flow-through container is made of longitudinal and transverse reinforcing beams with the possibility of vertical displacement along the gantry beam and contains ribs and elastically-tractable gaskets. The ribs are fixed to longitudinal and transverse reinforcing beams of the cover to form gaps between them, with the elastically-tractable gaskets set up and fixed to the lower faces of the ribs. The bottom of the container is fitted with ribs, which are fixed to longitudinal and transverse reinforcing beams of the bottom, with the formation of gaps between them smaller than the porous-hollow blocks. The lower row of blocks rest on the bottom of the container.

The cellular container has side walls made of a set of vertical, transverse, and longitudinal wires or rods, connected between corner bars, the top gantry beam, and longitudinal and transverse reinforcing beams of the bottom. The wires or rods form cells in the walls smaller than the transverse dimensions of the porous-hollow blocks to hold the blocks therein. Similarly the cover and the bottom are made from sets of longitudinal and transverse wires or rods connected to longitudinal and transverse reinforcing beams of the cover and the bottom, respectively, to form gaps smaller than the porous-hollow blocks. The cover is hinged to a transverse beam of the gantry beam, and a lock mechanism for the cover is fixed to the opposite transverse beam.

The method of manufacture of porous-hollow blocks for the load for the biofilter includes the steps of preparation by plastic molding of clay granules 8–12 mm in diameter, placing the granules in layers of 60–80 mm high in a mold, determination of the temperature of the beginning of swelling and a temperature range of swelling of initial clay, heat treatment of the layer by way of heating, swelling and baking, with the subsequent cooling down to a temperature of 800°–1000° C. and the further drop of the temperature down to 70°–80° C. The heat treatment is performed with three isothermal time delays, the first being at the temperature of the beginning of the swelling for 10–15 minutes, the temperature having been increased to the temperature of beginning of swelling at a rate of 40°–60° C./minute. The temperature is raised into the range of swelling and the second isothermal time delay is performed in the clay swelling temperature range of 1,140°–1,150° C. for 15–20 minutes, wherein the baking of the swollen granules is effected in a pin-point direction—from the block surface towards the center, with a minimum temperature drop in the center of the layer of the granules and on the surface. The third isothermal time delay is performed at the temperature of solidification of the clay in the pyroplastic state for 30–60 minutes and after the solidification of the melt, the blocks are cooled down to a temperature of 800°–1000° C. over 10–15 minutes and at this temperature a fourth isothermal time delay is performed for 40–60 minutes. Further cooling to a temperature of 70°–80° C. is performed over 60–180 minutes with the use of air and water vapours for an intensive heat abstraction.

The mold may be configured to produce porous blocks in the form of rectangular prisms with openings therethrough and along their periphery. Alternately, the molds may be configured to produce porous blocks without the through channels. These molds may take the form of a loading car with enlarged sides to obtain porous-hollow plates, which afterwards are sawed or cut into the blocks of desired size.

THE BEST MODE FOR CARRYING OUT THE INVENTION

Figure 1:
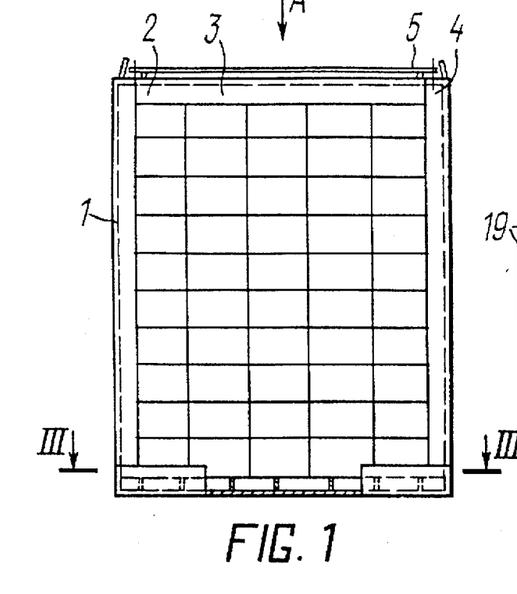
FIG. 1 illustrates the biofilter load in the form of a through container with porous-hollow blocks.
Figure 2:
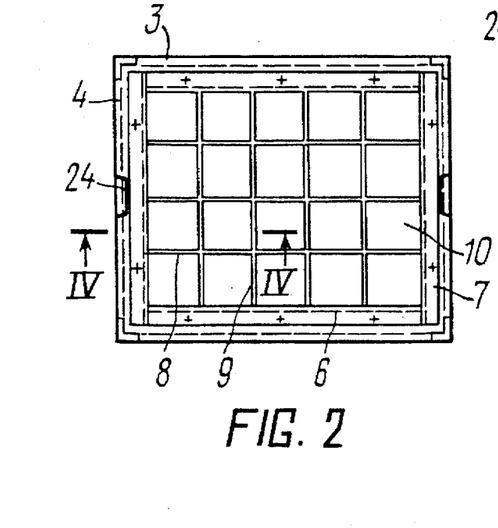
FIG. 2 is a view by arrow "A" in FIG. 1.
Figure 3:
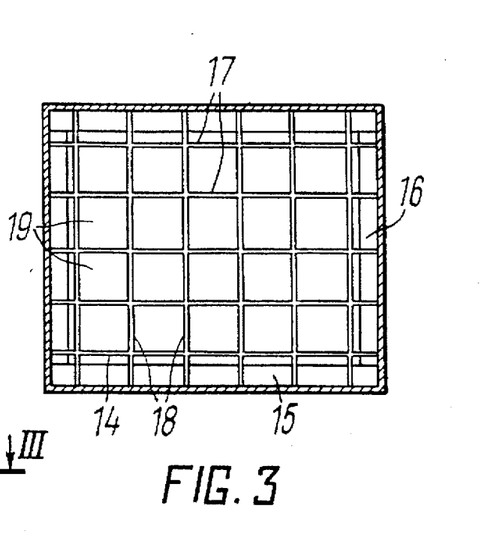
FIG. 3 is the section III—III in FIG. 1.
Figure 4:
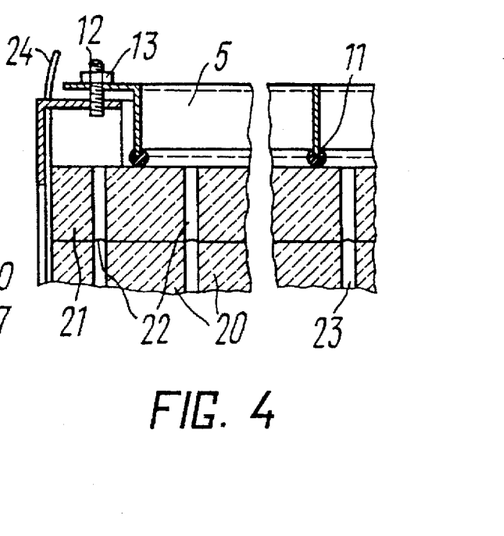
FIG. 4 is the section IV—IV in FIG. 2.
Figure 5:
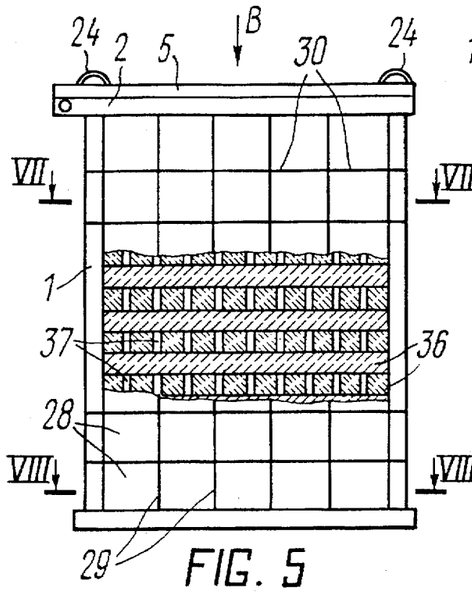
FIG. 5 is the load for the biofilter in the form of a cellular container with porous-hollow blocks placed one on the other and one close to the other with the formation of through channels.
Figure 6:
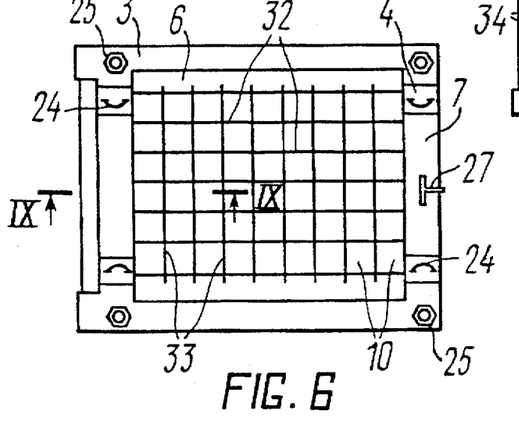
FIG. 6 is the view by arrow "B" in FIG. 5.
Figure 7:
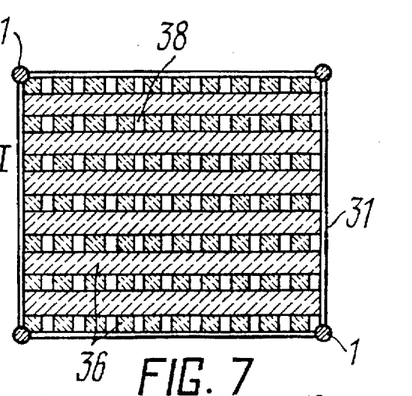
FIG. 7 is the section VII—VII in FIG. 5.
Figure 8:
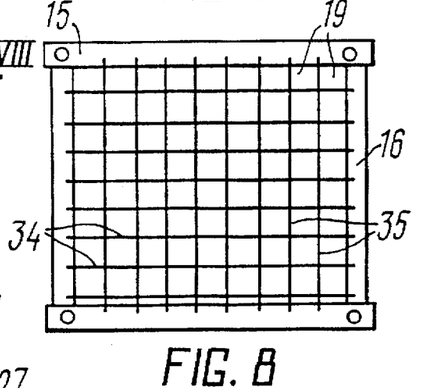
FIG. 8 is the section VIII—VIII in FIG. 5.
Figure 9:
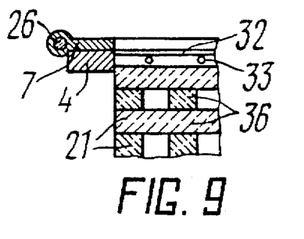
FIG. 9 is the section IX—IX in FIG. 6.

The biofilter load (FIG. 1) comprise a three-dimensional structural module in the shape of a through container, including bars 1, and gantry beam 2 consisting of longitudinal 6 and transverse 7 reinforcing beams (FIGS. 2 and 4), and transverse 8 and longitudinal 9 ribs, attached to the transverse 7 and longitudinal 6 reinforcing beams, respectively, forming gaps 10. Elastically-tractable gaskets 11 are set up on the faces of ribs 8 and 9. Cover 5 is set up with the possibility of a vertical displacement in relation to the gantry beam 2 with the help of screws 12 and nuts 13. The bottom 14 is attached to bottom faces of bars 1. The bottom includes longitudinal 15 and transverse 16 reinforcing beams, to which longitudinal 17 and transverse 18 ribs are attached with a formation of gaps 19. Inside the container, porous-hollow blocks 20 made of REDOXID are put on the ribs 17 and 18 of the bottom 14 and are stacked one on top of the other. The REDOXID blocks have pores 21 and through gaps 22, which form a purification layer with the through vertical channels 23 (FIG. 4). For rigging work with the container, cargo clamps 24 are provided.

In an alternative version, a biofilter load consists of a voluminous frame module in the shape of a cellular container (FIGS. 5-9), including bars 1, a gantry beam 2, consisting of longitudinal 3 and transverse 4 reinforcing elements, a cover 5 made of longitudinal 6 and transverse 7 reinforcing beams, and a bottom 14 made of longitudinal 15 and transverse 16 reinforcing beams. The bars 1 are attached to the gantry beam 2 with nuts 25, which are set in a groove (not shown in the drawing) of the longitudinal reinforcing elements 3 of the gantry beam 2.

The cover 5 on its one side is attached with the help of a hinge 26 to the transverse reinforcing elements 3 of the gantry beam 2, and on its other side has the lock mechanism 27. For rigging work with the container, cargo clamps 24 are provided fastened to transverse reinforcing elements 4 of the gantry beam 2. To form the cells 28 in the walls of the container, vertical 29, longitudinal 30, and transverse 31 wires or rods, are connected together and fixed to the bars 1, longitudinal 3 and transverse 4 reinforcing elements of the gantry beam 2, and also to the longitudinal 15 and transverse 16 force beams of the bottom 14. To form the gaps 10 in the cover 5 and voids 19 in the bottom 14, the longitudinal 32 and transverse 33 wires or rods for the cover are used, which are connected together and fastened to the longitudinal 6 and transverse 7 reinforcing beams of the cover 5, and the longitudinal 34 and transverse 35 wires or rods for the bottom 14 are connected together and to the longitudinal 15 and transverse 16 reinforcing beams of the bottom 14. Inside the container, on the longitudinal 34 and transverse 35 wires or rods of the bottom 14 and staggering one upon the other, are packed the porous-hollow blocks 36, made of REDOXID, which have pores 21, to form therebetween horizontal 37 and vertical 38 through channels in the purification layer.

The assembly of the load for the biofilter of the first embodiment (FIGS. 1-4) is carried out as follows:

The container with removed cover 5 is placed on a tray (not shown in the drawings). The voluminous porous-hollow blocks 20 are stacked in the container according to the predetermined scheme, for instance, in a parallelepiped shape aligning the holes 22 and forming the purification layer with the through channels 23. After the filling of the container with the porous-hollow blocks 20, the cover 5 is fastened by means of screws 12 screwed on to the longitudinal 3 and transverse 4 reinforcing elements of the gantry beam 2. Nuts 13 tightened on screws 12 move cover 5 uniformly with respect with the gantry beam 2 to press, through the elastically-tractable gaskets 11, the porous-hollow blocks 20 close one to the other and against ribs 17 and 18 of the bottom 14. The gaps 19 in the bottom 14 are made with dimensions smaller than those of porous-hollow blocks 20 to prevent them from falling out of the container.

In the alternative embodiment (FIGS. 5-9), the container with cover 5 raised about hinge 26 is placed on a tray (not shown in the drawings). The porous-hollow blocks 36 are staggered and stacked one on the other and close to each other, for example, in a parallelepiped shape, in the ratio of the length to the width and to the thickness equal to 1:b:h=1:(3-4):(2-3), forming the purification layer with the horizontal 37 and vertical 38 through channels. After the filling of the container with the porous-hollow blocks 36, the cover 5 is turned around the hinge 26, and by the wires or rods 32 and 33 of the cover 5 against the porous-hollow blocks 36, such blocks are pressed together against one another and against the wires or rods 34 and 35 of the bottom 14. The cover 5, with the help of the mechanism 27, is fixed to the gantry beam 2. The dimensions of gaps 10 and 19 of the cover 5 and the bottom 14, respectively, and also the cells 28 in the walls of the container, are made smaller than porous-hollow blocks 36 to prevent them from falling out of the container.

The elements of the containers, e.g., the bars 1, the gantry beam 2, the cover 5, the bottom 14, etc., may be made of a profile rolled stock of pipes of materials such as stainless steel, aluminum alloys, various plastics, or other suitable materials.

The porous-hollow blocks are made of the material REDOXID, which contains burnt clay raw material, molded into porous blocks with or without openings, and with connected open pores of diameter less than or equal to 20 mm and of total porosity of between 7–91%. The through holes 22 in blocks 20 have a diameter 40–60 mm with total volume 55–60% and trough-like channels may be provided along the perimeter of the block. The blocks without through holes are made in the form of squared beams 36 with the ratio of the length to the width and to the height equal to 1:(3–4):(2–3), respectively. The squared beams 36 are packed in one on the other with the formation of the through channels 37 and 38 in the purification layer. The ratio of the surface area of the opened pores 21 in one cubic meter of the purification layer to its surface area is taken equal to $SpS:Spl.1m^3=(8–12) \cdot 10^3$, and the ratio of the through channels' surface area in one cubic meter of the purification layer, made of the porous-hollow blocks 20 with through holes 22 or of porous-hollow blocks 36 packed to form through channels 37 and 38, to the surface area of one cubic meter of the purification layer is $StS:Spl.1m^3=0.7–2.3$. The ratio of components, % by mass, in REDOXID material is as follows:

|  |  |
|---|---|
| silicon oxide | 30–65 |
| iron oxide | 4–8 |
| aluminum oxide | 14–21 |
| alkali metal oxides | 2–6 |
| [losses in] other Products of calcination | - the balance. |

Figure 13:
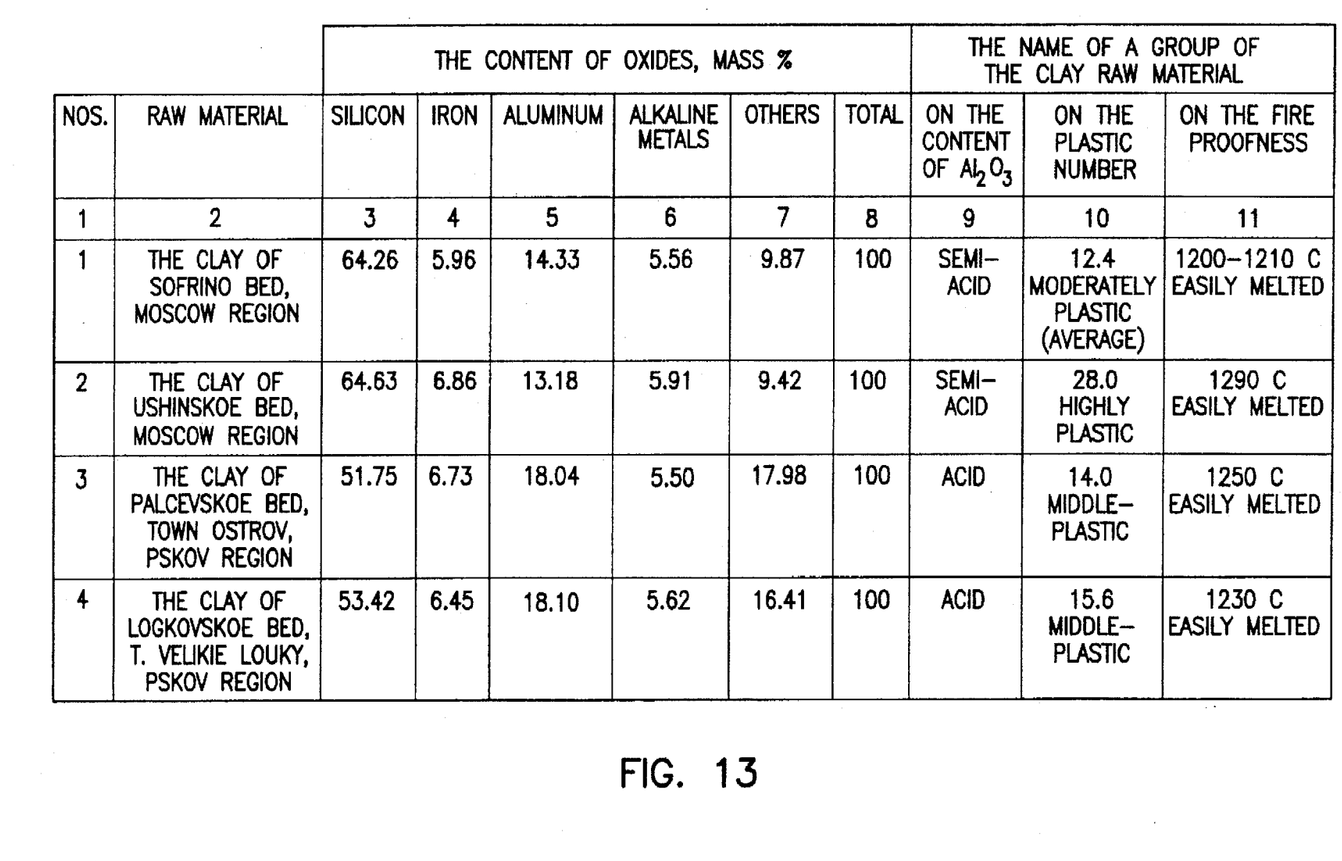
FIG. 13 is a table showing the chemical compositions of raw materials used in making blocks used in the invention.
Figure 14:
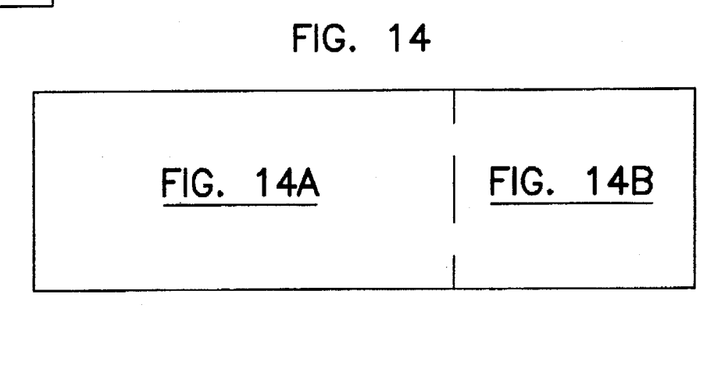
FIG. 14 is a schematic showing of a table made up of parts labeled FIG. 14A and FIG. 14B showing the relationship between FIGS. 14A and 14B.
Figure 14A:
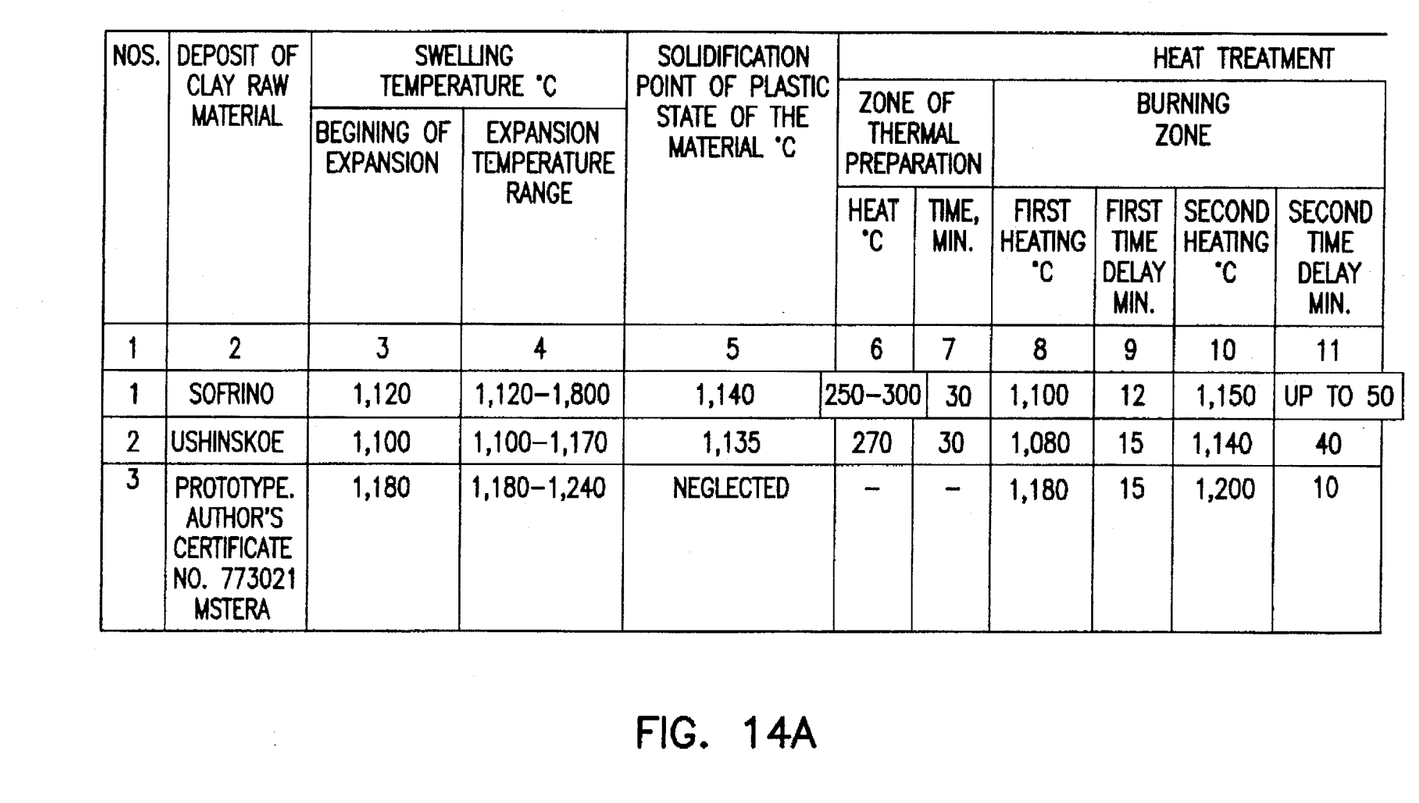
FIG. 14A and FIG. 14B are two parts of a table giving information regarding the thermal treatment of granules of material in the making of blocks for use in the invention.
Figure 14B:
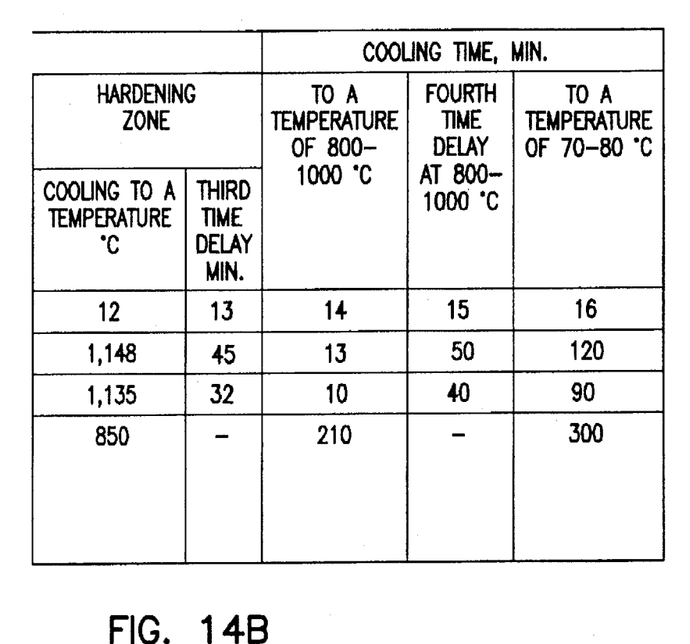

The chemical compositions of the raw materials used are presented in FIG. 13.

Figure 10:
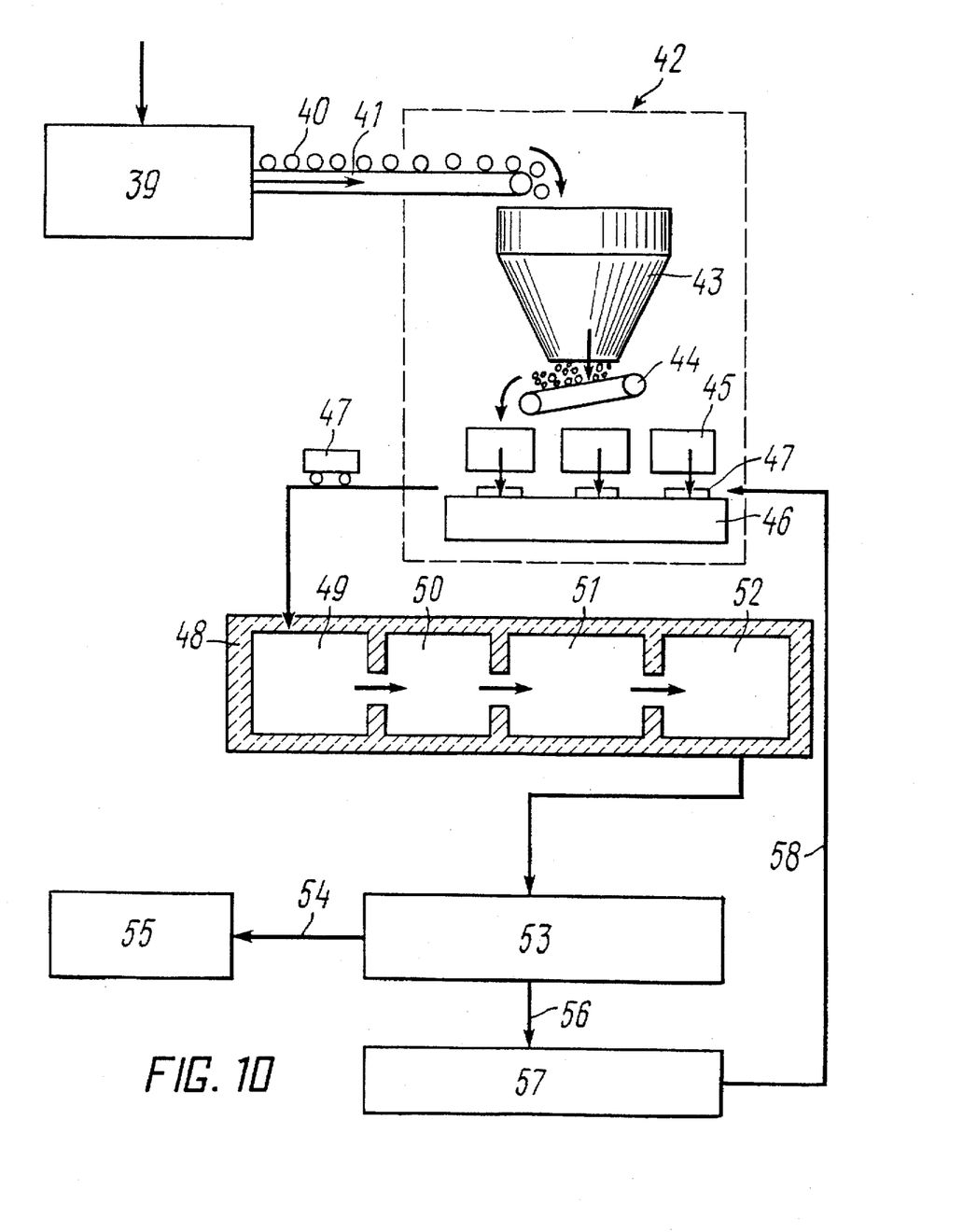
FIG. 10 is a schematic diagram of the technological process for manufacturing porous-hollow blocks for the biofilter load.
Figure 11:
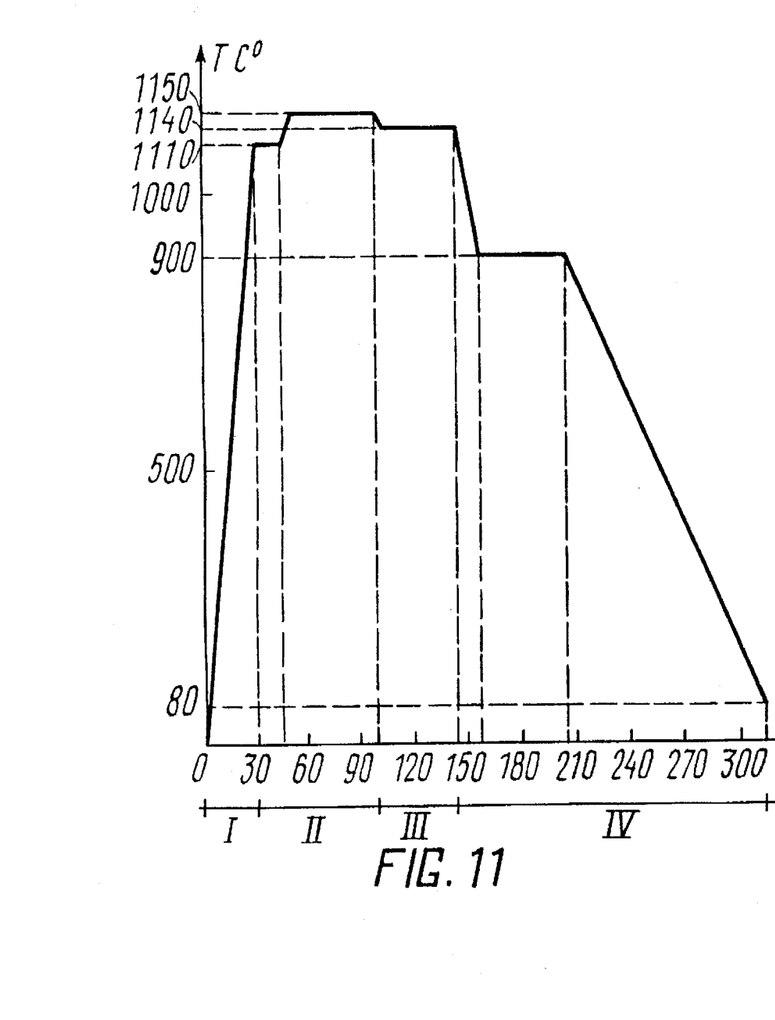
FIG. 11 is a graph illustrating the burning of porous-hollow blocks made of clay raw material of Sofrino's deposit, Moscow region.
Figure 12:
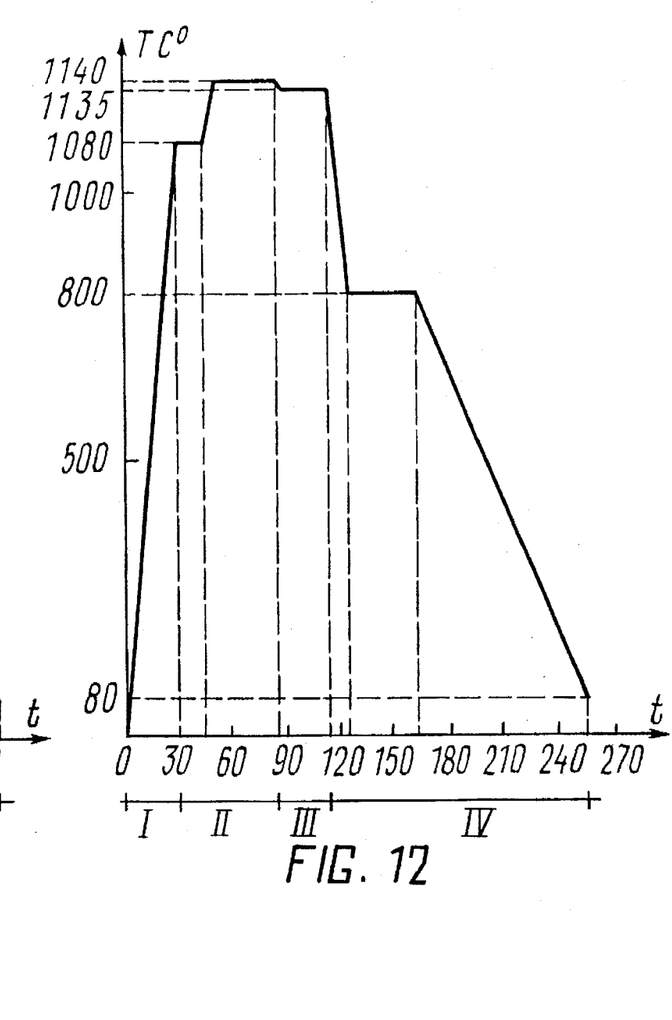
FIG. 12 is a graph illustrating the burning of porous-hollow blocks, made of clay raw material of Ushinskoe's deposit, Ryasan region

The method of manufacture of porous-hollow blocks in the biofilter load is effected as it is shown in the following scheme of the technological process (FIG. 10).

The clay raw material from the quarry is delivered into the shop 39, where a soft-mud molding process is used to make granules 40, 8 to 16 mm in diameter, and to dry them to a humidity level of 2–4%. Granules 40 are delivered by the belt conveyer 41 to the weighing station 42 for weighing and charging them into molds, where they first get into the service bunker 43 and, by means of the vibrating chute 44, are fed into the weighers 45. The granules are graded in weighers 45 to fractions of 8, 10 and 12 mm and are conveyed to the charging station 46, where they are placed in layers into molds or charging cars 47, 60–80 mm in height. From the charging station 46 molds or cars 47 are delivered to the tunnel kiln 48 and the thermal preparation zone 49. The thermal preparation zone 49 of the kiln 48 is used to prepare granules 40 for burning; in this case, a thermomechanical analysis is used to preliminary determine the temperature of the beginning of swelling, the swelling temperature range of the clay raw material, and the stepwise mode of thermal treatment of the layer of granules 40. The thermal preparation is carried out at a temperature of 250°–300° C., the rate of heating up to this temperature being 5–6 minutes. Then, the layer of granules 40 in molds or cars 47 is delivered into the burning zone 50, where at a rate of 40°–60° C./minute it is heated to the lower limit of the beginning of swelling, and the first isothermal time delay is performed below the limit of beginning of the swelling of granules up to equalizing temperature over the layer height during 10–15 minutes. Then the granules are made porous by raising the temperature during 6–10 minutes up to the middle of the swelling temperature range (1,140°–1,150° C.), which is optimal for rendering the clay raw material amorphous and for swelling of granules; then the second isothermal time delay is effected at this temperature for 15–50 minutes sintering the swollen granules in pin-point direction from the surface of the block towards the center, ensuring a minimum temperature drop in the center of the granules layer and on the surface, owing to filling the intergranular space. This process is performed without the formation of a low-viscous melt, since pores at this time are combined into large and isolated ones. Using a high-temperature thermomechanical analyzer TMA-1 (not shown in the drawings) of the "Rizhaki" firm (Japan), the solidification point of the pyroplastic state of the material is determined; the temperature in the burning zone 50 is lowered to the solidification point of the pyroplastic material, and then at this temperature the third isothermal time delay is performed until the temperature throughout the entire volume of the block is equalized during 30–60 minutes. The material is then conveyed to the hardening zone 51 of the kiln 48 and at the temperature of 800°–1000° C. the fourth isothermal time delay is performed until the temperature throughout the entire volume of the block is equalized during 40–60 minutes. Further cooling of the blocks is effected in the cooling zone 52 of the kiln 48 to a temperature of 70°–80° C. during 60–180 minutes with the use of air and water vapors for an intensive heat abstraction. Through voids in the block and along its periphery in the vertical plane are made by means of special devices (not shown in the drawings) in the mold 47.

From a cold part 52 of the kiln 48 the molds or the cars 47 with the finished block are installed in the discharge station 53 by means of the grips of a telpher (not shown in the drawings) and the cars 47 are returned to the burning line of the kiln 48. The removed molds or cars 47 with finished blocks are subjected to dismantling of forms at the product discharge station 53, and the released blocks are installed on a stockroom pallet (not shown in the drawings) and, as it becomes full, it is sent along the monorail 54 to the stockroom 55, where the blocks are placed in the load for biofilter. In the manufacture of the porous block without through openings in the form of the bars 36, before the removing of the forms at the discharge station 53, the cars 47 with enlarged (built up) sides are delivered to a station for sawing or cutting of the swollen plates. At this station (not shown in the drawings) they are sawed up with a circular saw into the bars of desired dimensions. Dismantled forms or cars 47 via the conveyer 56 are delivered at the station 57 of the utilized and reserve molds or cars 47, which by the feedback 58 are conveyed to the station 46 for charging the granules 40 into the mold or car 47. The circle is repeated. Examples of the Process's Implementation.

Figures 15, 16:
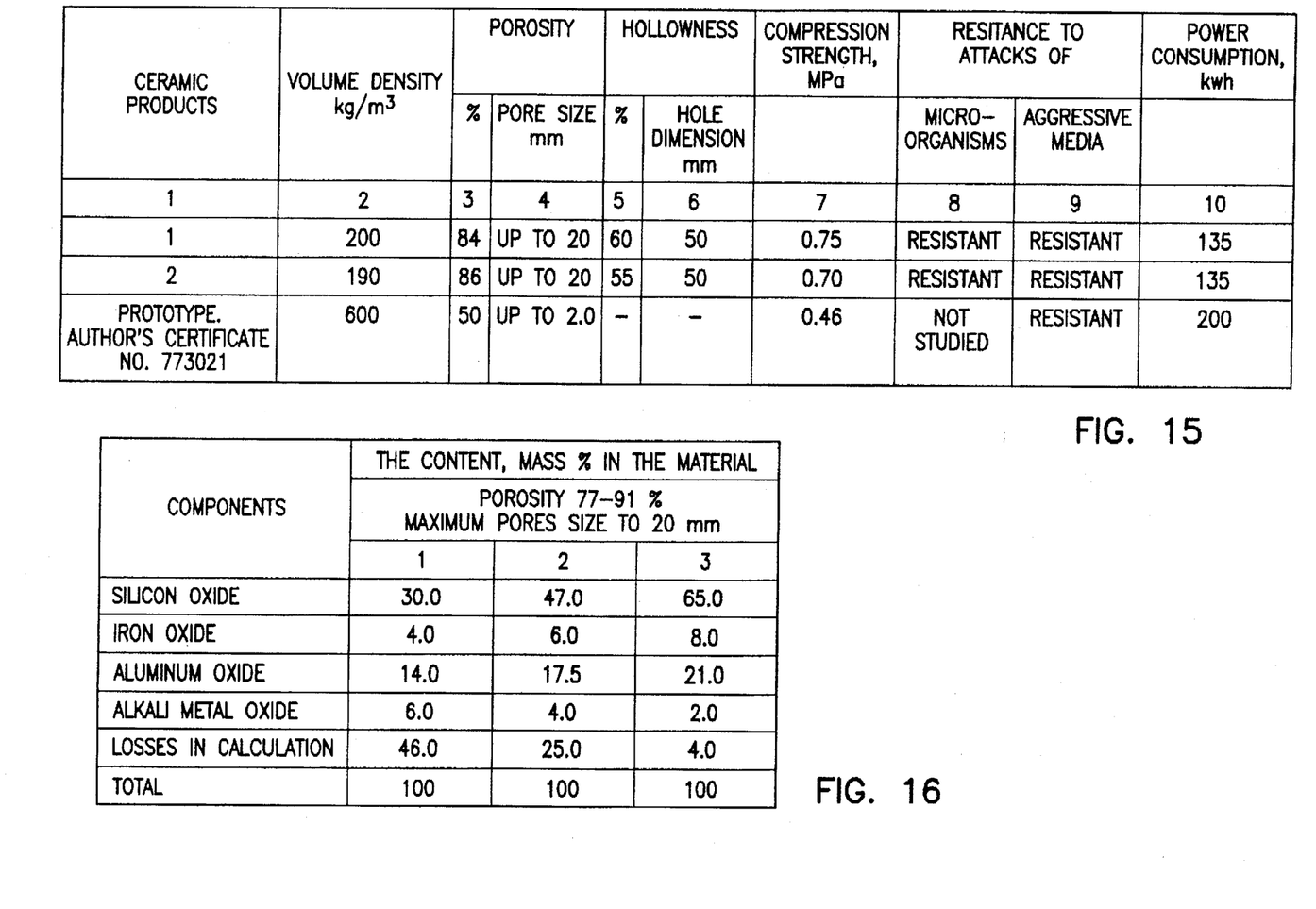
FIG. 15 is a table giving technical data and power consumption information for manufacture of prototype blocks for use in the invention.
FIG. 16 is a table giving three examples of chemical composition of prototype blocks for use in the invention.

Using the clay of the Sofrino and Ushinskoe deposits, raw granules 8, 10 and 12 mm in diameter are prepared (by the known method). At smaller dimensions, heating in the middle of the layer is difficult, while the use of granules exceeding 12 mm yields a large grain structure. Granules are dried to a level of humidity of 2–4% and then placed in layers into a mold with the formation of a general layer 60–80 mm high. Using the method of a thermomechanical analysis, the temperature of the beginning of the swelling temperature range of the initial clay raw material is determined preliminarily and, also, using the high-temperature thermomechanical analyzer TMA-1 of the "Rizhaki" firm (Japan), the solidification point of the obtained pyroplastic state of the material is determined. The thermal treatment of the layer of granules in the mold, according to the claimed technical solution and the proto-type, is effected in compliance with the modes given in FIGS. 14A and 14B and FIGS. 11 and 12. Given in FIG. 15 are technical data and power consumption of the obtained porous-hollow blocks for biological filters according to the claimed solution and the prototype, and in FIG. 16 there are three examples of a chemical composition of REDOXID material manufactured under above-mentioned method.

The load for a biofilter works as follows:

During starting and adjustment operations, before the actual starting of operation of a purification installation, the growing of microorganisms is carried out on the developed surface of opened and deep pores of porous-hollow blocks 20 or 36, which constitute the purification layer in the first and the second embodiments, respectively. As a result of a microorganism's growth during the first 30–35 days on porous-hollow blocks 20 and 36 made of REDOXID material, the biofilm with immobilized microorganisms is formed. Bacteria intensively develop in the upper layers of the purification layer which are responsible for the oxidation of organic compounds and ammonium nitrogen, and in deep pores and lower layers of the purification layer, numerous bacteria-denitrificators are developed which bring about the reduction of nitrites and nitrates to gaseous nitrogen. The experimental investigations shows that the thickness of a biofilm in the upper layers achieve 2 mm, and in lower layers—0.5 mm. Industrial and household sewage, after the primary separation in purification installations, flows to gaps 10 of the cover 5 of the biofilter, which can work under anaerobic or aerobic conditions. Under gravitation the sewage passes through the purification layer of the biofilter, in upper layers of which the oxidation of organic compounds and ammonium nitrogen and the retention of suspended substances takes place, and in lower layers and deep pores the reduction of nitrates and nitrites to gaseous nitrogen occur, which flows to the air. A comparative microbiological analysis shows that if the ratio of the surface area of the open pores 21 in one cubic meter of the purification layer to its surface area equals to $SpS:Spl.1m^3=(8-12)\cdot10$, then 1.2–1.5 times more of different kinds of aerobe microorganisms develop, than in the existing biofilter loads (keramzit, gravel or others). The municipal sewage at the concentration of contaminants by suspended substances or on the value of BOD in the interval from 100 mg/l having the norms of a water supply equal to 400–500 liter per person in a day to 600 mg/l under the norm of a water supply—100 l/person/day, after passing the claimed load, is cleaned up to required parameters under hydraulic loads from 3 to 6 cub.m/sq.m/day. Silting of the loading material REDOXID, manufactured in a shape of porous-hollow parallelepipeds 20 with through holes 22, or squared beams 36, stacked one on the other through channels 37 and 38, by the biofilm and suspended substances has not been observed, because the latter flow out along the through channels 23, 37, and 38 with the sewage to special precipitators, which are usually located just below the biofilters (not shown in the drawing). To provide an outflow of an utilized biofilm and suspended substances from the biofilter the ratio of the surface area of through channels 23 and 38 in one cubic meter of the purification layer to the surface area of one cubic meter of the purification layer equals $SpS:Spl.1m^3=0.7-2.3$.

The Example of Sewage Treatment.

The mixture of the household and industrial (10%) sewage treatment is carried out, after the primary precipitation in a two floor separator of a municipal sewage treatment installation, with the following content of ingredients in the inlet flow in mg/l:

| | |
|---|---|
| suspended substances | 37.0 |
| $BOD_{20}$ | 91.2 |
| ammonium nitrogen | 36.3 |
| nitrates | to 0.34 |
| nitrites | to 0.70 |
| the total content of the inorganic nitrogen | 36.5 |

The hydraulic load on the biofilters is varied from 2.0 to 47.3 $m^3/m^2$ in day.

Figure 17:
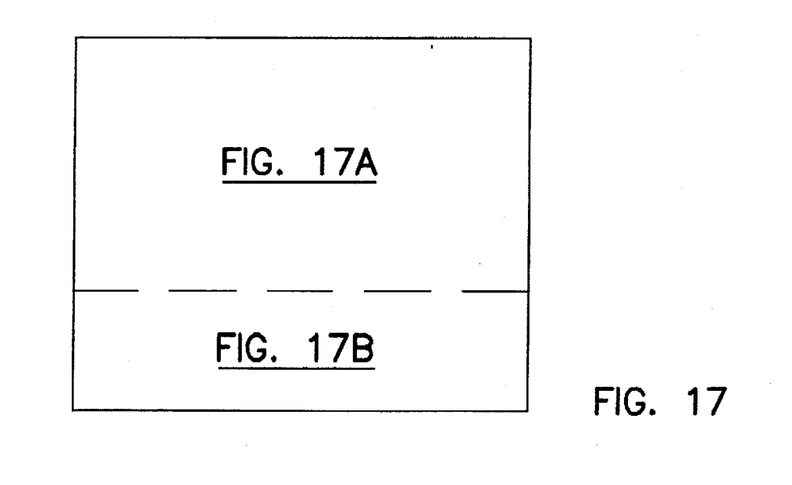
FIG. 17 is a schematic showing of a table made up of parts labeled FIG. 17A and FIG. 17B showing the relationship between FIGS. 17A and 17B.
Figure 17A:
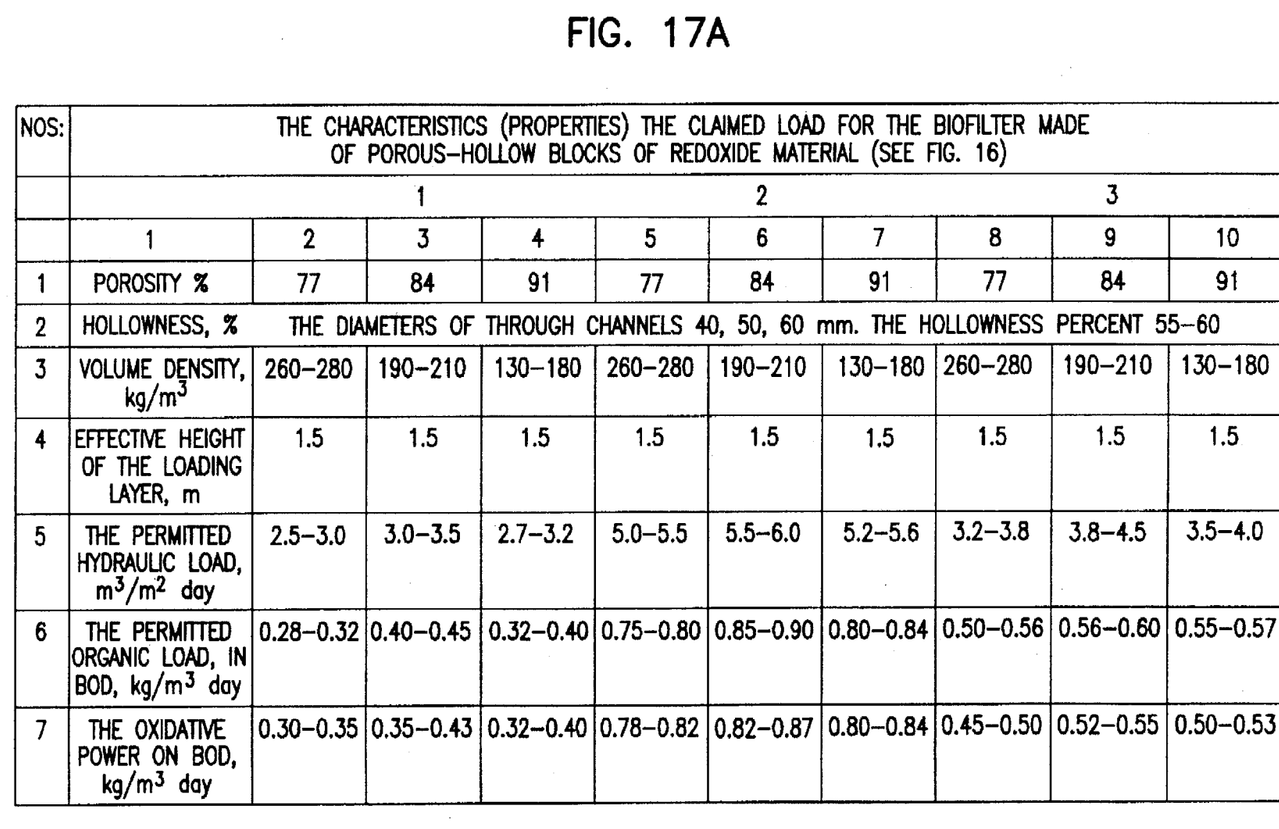
FIGS. 17A and 17B are two parts of a table providing information on the efficiency of an example sewage treatment.
Figure 17B:
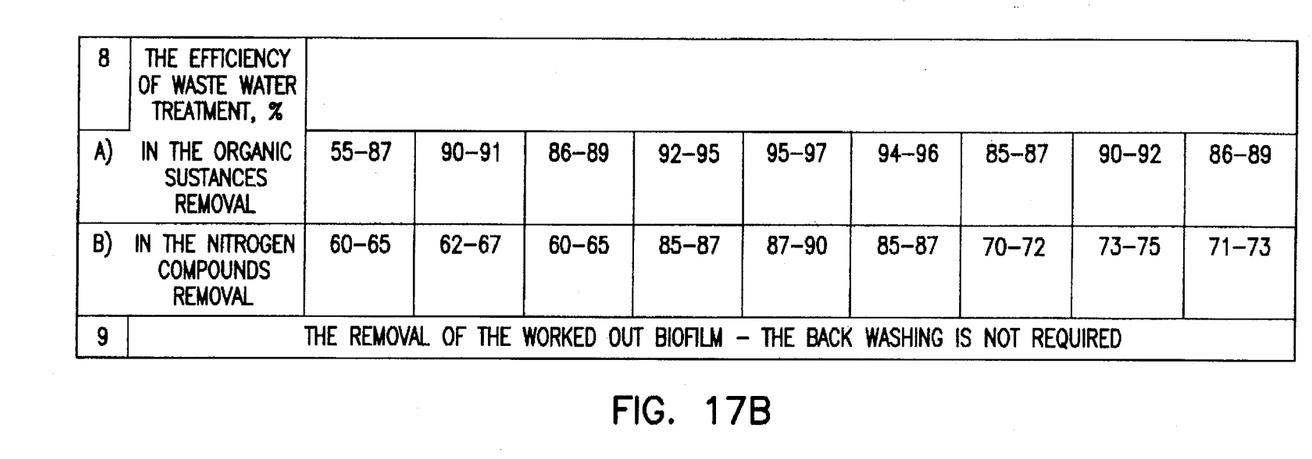

The data of the efficiency of the sewage treatment is presented in FIGS. 17A and 17B.

The Industrial Applicability.

The use of a proposed biofilter load will allow the construction of compact purification installations, convenient in use, stable to aggressive media, and without the need of a regeneration of the load during a long time period (about 10 years).

The efficiency of sewage treatment in the purification layer increases in the retention of suspended substances by 11–24%; in the removal of organic compounds by 11–17%; and in the removal of nitrogen-containing compounds by 40–45%.

TABLE 1

| | | The content of oxides, mass % | | | | | | The name of a group of the clay raw material | | |
|---|---|---|---|---|---|---|---|---|---|---|
| | | | | | | | | On the content of $Al_2O_3$ | On the plastic number | On the fire proofness |
| Nos. | Raw Material | Silicon | Iron | Aluminum | Alkaline Metals | Others | Total | | | |
| 1 | 2 | 3 | 4 | 5 | 6 | 7 | 8 | 9 | 10 | 11 |
| 1 | The clay of Sofrino bed, Moscow region | 64.26 | 5.96 | 14.33 | 5.56 | 9.87 | 100 | Semi-acid | 12.4 moderately plastic (average) | 1200–1210° C. easily melted |
| 2 | The clay of Ushinskoe bed, Moscow region | 64.63 | 6.86 | 13.18 | 5.91 | 9.42 | 100 | Semi-acid | 28.0 highly plastic | 1290° C. easily melted |
| 3 | The clay of Palcevskoe bed, town Ostrov, Pskov region | 51.75 | 6.73 | 18.04 | 5.50 | 17.98 | 100 | Acid | 14.0 middle-plastic | 1250° C. easily melted |
| 4 | The clay of | 53.42 | 6.45 | 18.10 | 5.62 | 16.41 | 100 | Acid | 15.6 | 1230° C. easily |

TABLE 1-continued

| | | The content of oxides, mass % | | | | | | The name of a group of the clay raw material | | |
|---|---|---|---|---|---|---|---|---|---|---|
| Nos. | Raw Material | Silicon | Iron | Aluminum | Alkaline Metals | Others | Total | On the content of $Al_2O_3$ | On the plastic number | On the fire proofness |
| | Logkovskoe bed, t. Velikie Louky, Pskov region | | | | | | | | middle-plastic | melted |

TABLE 2

| | | Swelling temperature °C. | | Solidification point of plastic state of the material °C. | Heat Treatment | | | | | | | |
|---|---|---|---|---|---|---|---|---|---|---|---|---|
| | | | | | Zone of thermal preparation | | Burning Zone | | | | Hardening Zone | |
| | Deposit of clay raw material | beginning of expansion | expansion temperature range | | first heating °C. | time, min | first heating °C. | first time delay min | second heating °C. | second time delay min | cooling to a temperature °C. | third time delay min |
| Nos. | | | | | | | | | | | | |
| 1 | 2 | 3 | 4 | 5 | 6 | 7 | 8 | 9 | 10 | 11 | 12 | 13 |
| 1 | Sofrino | 1,120 | 1,120–1,800 | 1,140 | 250–300 | 30 | 1,100 | 12 | 1,150 | up to 50 | 1,148 | 45 |
| 2 | Ushinakoe | 1,100 | 1,100–1,170 | 1,135 | 270 | 30 | 1,080 | 15 | 1,140 | 40 | 1,135 | 32 |
| 3 | Prototype. Author's Certificate No. 773021 Matera | 1,180 | 1,180–1,240 | Neglected | — | — | 1,180 | 15 | 1,200 | 10 | 850 | — |

| | Cooling time, min. | | |
|---|---|---|---|
| Nos. | To a temperature of 800–1000° C. | Fourth time delay at 800 1000° C. | To a temperature of 70–80° C. |
| 1 | 14 | 15 | 16 |
| 1 | 13 | 50 | 120 |
| 2 | 10 | 40 | 90 |
| 3 | 210 | — | 300 |

TABLE 3

| | | Porosity | | Hollowness | | Compression strength, MPa | Resistance to attacks of | | Power consumption, kW h |
|---|---|---|---|---|---|---|---|---|---|
| Ceramic Products | Volume density, kg/cub. m | % | Pore size mm | Hole % | dimension mm | | micro-organisms | aggressive media | |
| 1 | 2 | 3 | 4 | 5 | 6 | 7 | 8 | 9 | 10 |
| 1 | 200 | 84 | up to 20 | 60 | 50 | 0.75 | resistant | resistant | 135 |
| 2 | 190 | 86 | up to 20 | 55 | 50 | 0.70 | resistant | resistant | 135 |
| Prototype. Author's Certificate No. 773021 | 600 | 50 | up to 2.0 | — | — | 0.46 | not studied | resistant | 200 |

TABLE 4

|  | The content, mass % in the material | | |
|---|---|---|---|
| Components | Porosity 77–91% maximum pores size to 20 nm | Porosity 77–91% maximum pores size to 20 nm | Porosity 77–91% maximum pores size to 20 nm |
| Silicon oxide | 30.0 | 47.0 | 65.0 |
| Iron oxide | 4.0 | 6.0 | 8.0 |
| Aluminum oxide | 14.0 | 17.5 | 21.0 |
| Alkali metal oxide | 6.0 | 4.0 | 2.0 |
| Losses in calculation | 46.0 | 25.0 | 4.0 |
| Total | 100 | 100 | 100 |

TABLE 5

Nos: The characteristics (properties) The claimed load for the biofilter made of porous-hollow blocks of Redoxid material (see Table 4)

| | | 1 | | | 2 | | | 3 | |
|---|---|---|---|---|---|---|---|---|---|
| 1 | 2 | 3 | 4 | 5 | 6 | 7 | 8 | 9 | 10 |
| 1 Porosity % | 77 | 84 | 91 | 77 | 84 | 91 | 77 | 84 | 91 |
| 2 Hollowness, % | The diameters of through channels 40, 50, 60 mm. The hollowness percent 55–60 | | | | | | | | |
| 3 Volume density, kg/m$^3$ | 260–280 | 190–210 | 130–180 | 260–280 | 190–210 | 130–180 | 260–280 | 190–210 | 130–180 |
| 4 Effective height of the loading layer, m | 1.5 | 1.5 | 1.5 | 1.5 | 1.5 | 1.5 | 1.5 | 1.5 | 1.5 |
| 5 The permitted hydraulic load, m$^3$/m$^2$ day | 2.5–3.0 | 3.0–3.5 | 2.7–3.2 | 5.0–5.5 | 5.5–6.0 | 5.2–5.6 | 3.2–3.8 | 3.8–4.5 | 3.5–4.0 |
| 6 The permitted organic load in BOD, kd/m$^3$ day | 0.28–0.32 | 0.40–0.45 | 0.32–0.40 | 0.75–0.80 | 0.85–0.90 | 0.80–0.84 | 0.50–0.56 | 0.56–0.60 | 0.55–0.57 |
| 7 The oxidative power on BOD, kd/m$^3$ day | 0.30–0.35 | 0.35–0.43 | 0.32–0.40 | 0.78–0.82 | 0.82–0.87 | 0.80–0.84 | 0.45–0.50 | 0.52–0.55 | 0.50–0.53 |
| 8 The efficiency of waste water treatment, % | | | | | | | | | |
| a In the organic substances removal | 55–87 | 90–91 | 86–89 | 92–95 | 95–97 | 94–96 | 85–87 | 90–92 | 86–89 |
| b In the nitrogen compounds removal | 60–65 | 62–67 | 60–65 | 85–87 | 87–90 | 85–87 | 70–72 | 73–75 | 71–73 |
| 9 The removal of the worked out biofilm - The back washing is not required | | | | | | | | | |

We claim:

1. A biofilter, comprising a three dimensional frame module having pillars, bound above by means of crossbars with longitudinal and transverse reinforcing elements and below by means of a bottom with longitudinal and transverse reinforcing beams having gaps therebetween; porous-hollow blocks of burnt clay raw material arranged inside the module so as to form a purification structure with through channels such that the frame module is in the form of a flow through container provided with a cover mounted so as to provide for compacting of the blocks and pressing them against each other and against the bottom, the porous-hollow blocks being made from material at the following ratio of components, by percent weight:

| Silicon oxide | 30–65 |
|---|---|
| Iron oxide | 4–8 |
| Aluminum oxide | 14–21 |
| Oxides of alkali metals | 2–6 |
| [Losses in] Other products of calcination | - the balance | and are shaped as polyhedrons or as bodies of revolution or as combinations of polyhedrons and bodies of revolution, with the ratio of surface area of open pores in one cubic meter of the purification layer to the area of its surface equal to SpS:Spl.1m$^3$=(8–12)·10, and the ratio of surface area of through channels in one cubic meter of the purification layer that is formed by porous-hollow blocks with through channels or by porous-hollow blocks arranged one on the other and one close to the other with the formation of through channels, the surface area of one cubic meter of the purification layer being equal to StS:Spl.1m$^3$=0.7–2.3, where

| SpS | is the surface area of open pores in one cubic meter of the purification layer; |
|---|---|
| StS | is the surface area of through channels in one cubic meter of purification layer made of said porous-hollow blocks with through channels or of said porous-hollow blocks arranged one on the other and one close to the other to form through channels; and |
| Spl.1m$^3$ | is the surface area of one cubic meter of the purification layer. |

2. The biofilter of claim 1, wherein the porous-hollow blocks are of polyhedron shape and are manufactured in the form of a rectangular prism with the length to the width and to the height being 1:(1.5–2.0):(1.5–2.0), respectively, and with the vertical holes in the body of the prism and through channels along the perimeter of the prism in the vertical plane, or in the shape of a girder with the length to the width and to the height being 1:(3.0–4.0):(2.0–3.0), respectively.

3. The biofilter of claim 2 having a container cover made of longitudinal and transverse reinforcing beams including a gantry beam and capable of vertical displacement along the gantry beam, said reinforcing beams being provided with ribs and elastically-tractable gaskets, the ribs being fastened to said reinforcing beams of said cover to form gaps between them, the elastically-tractable gaskets being set up and fastened to the lower part of said ribs, the bottom of the container being provided with edges which are fastened to said reinforcing beams at the bottom to form gaps between them that have smaller dimensions than the dimensions of the porous-hollow blocks, and having contact area for the mounting of a lower row of the purification structure on it.

4. The biofilter of claim 1, 2, or 3, wherein the porous container is provided with side walls made from sets of vertical, transverse, and longitudinal wires or rods connected together, to the bars, to longitudinal and transverse power elements of the gantry beam and also to longitudinal and transverse force beams of the bottom to form, in the walls, cells with sizes less than the transverse size of the porous-hollow blocks, and wherein the cover and the bottom are made of said sets of longitudinal and transverse wires or rods, connected together to said longitudinal and transverse force beams of the cover and to the bottom, respectively, to form voids whose sizes are less than the sizes of the porous-hollow blocks, the cover being hingedly fastened to the transverse element of said gantry beam and having a lock mechanism.

5. A method of manufacture of three-dimensional, porous-hollow blocks for a biofilter, including preparation of granules, 8–12 mm in diameter, from a clay by way of soft-mud moulding; placing layers of 60–80 mm high granules horizontally in a mould; determining the temperature at which the granules will begin to swell, the temperature range of the swelling of the initial clay and the temperature of solidification of the initial clay in the pyroplastic state; heating the clay in the mold to a temperature of the beginning of swelling at a rate of 40°–60° C./minute and isothermally maintaining that temperature for 10–15 minutes; heating the clay in the mold to a temperature in the clay swelling temperature range of 1,140°–1,150° C. and isothermally maintaining that temperature for 15–50 minutes, whereby sintering of the swollen granules is effected in a pin-point direction from the product surface toward the center, with a minimum temperature drop in the center of the layer of granules and on the surface; lowering the temperature to the temperature of solidification of the clay in the pyroplastic state and isothermally maintaining that temperature for 30–60 minutes; after solidification of the melt, the products being cooled down to a temperature of 800°–1000° C. during 10–15 minutes; and isothermally maintaining this temperature for 40–60 minutes; thereafter a temperature drop to a level of 70°–80° C. being performed during 60–180 minutes with the use of air and water vapours for an intensive heat abstraction.

6. The method of claim 5, wherein holes in the porous-hollow blocks are in the form of a rectangular prism and are formed with the help of fixtures in the mould.

7. The method of claim 5, wherein the porous-hollow blocks are formed without through holes, being carried out in a mould in the form of a loading car having sides to make the porous plates, which are formed afterwards into beams of requisite sizes.

8. A biofilter, comprising a container having a top, a bottom, and lateral walls; and hollow porous blocks of kilned clay arranged inside said container in contact with each other so as to be self-bearing and to form a purification structure having through flow channels between exposed surfaces for the stimulation of microorganisms; said porous blocks having porosity between seventy-seven and ninety-one percent and having open pores therein.

9. A biofilter in accordance with claim 8, wherein the top of the container is formed as a cover that presses the porous blocks together when in closed position.

10. A biofilter in accordance with claim 9, wherein the cover comprises pillars bound together by crossbeams providing longitudinal and transverse reinforcing elements.

11. A biofilter in accordance with claim 8, wherein the ratio of surface area of open pores in one cubic meter of the purification layer to the area of its surface equals $SpS:Spl.1m^3=(8-12)\cdot 10$, where SpS is the surface area of open pores in one cubic meter of the purification layer; and $Spl.1m^3$ is the surface area of one cubic meter of the purification layer.

12. A biofilter in accordance with claim 8, wherein the ratio of surface area of the through flow channels to the surface area of one cubic meter of the purification layer equals $StS:Spl.1m^3=0.7-2.3$, where SpS is the surface area of open pores in one cubic meter of the purification layer; and StS is the surface area of through channels in one cubic meter of purification layer made of said porous-hollow blocks with through channels or of said porous-hollow blocks arranged one on the other and one close to the other to form through channels.

13. A biofilter in accordance with claim 8, wherein the hollow porous blocks comprise by percent weight:

| | |
|---|---|
| Silicon oxide | 30–65 |
| Iron oxide | 4–8 |
| Aluminum oxide | 14–21 |
| Oxides of alkali metals | 2–6 |
| [Losses in] Other products of calcination | – the balance. |

14. The biofilter of claim 1 having a container cover made of longitudinal and transverse reinforcing beams including a gantry beam and capable of vertical displacement along the gantry beam, said reinforcing beams being provided with ribs and elastically-tractable gaskets, the ribs being fastened to said reinforcing beams of said cover to form gaps between them, the elastically-tractable gaskets being set up and fastened to the lower part of said ribs, the bottom of the container being provided with edges which are fastened to said reinforcing beams at the bottom to form gaps between them that have smaller dimensions than the dimensions of the porous-hollow blocks, and having contact area for the mounting of a lower row of the purification structure on it.

15. The biofilter of claim 14, wherein the porous container is provided with side walls made from sets of vertical, transverse, and longitudinal wires or rods connected together, to the bars, to longitudinal and transverse power elements of the gantry beam and also to longitudinal and transverse force beams of the bottom to form, in the walls, cells with sizes less than the transverse size of the porous-hollow blocks, and wherein the cover and the bottom are made of said sets of longitudinal and transverse wires or rods, connected together to said longitudinal and transverse force beams of the cover and to the bottom, respectively, to form voids whose sizes are less than the sizes of the porous-hollow blocks, the cover being hingedly fastened to the transverse element of said gantry beam and having a lock mechanism.

* * * * *